J. STEPHENSON.

Car Axle-Box.

No. 8,086. Reissued Feb. 19, 1878.

*Witnesses:*

D. G. Stuart

A. S. Watkins

*Inventor:*

John Stephenson by D. Hannay atty.

N. PETERS, PHOTO-LITHOGRAPHER, WASHINGTON, D. C.

UNITED STATES PATENT OFFICE.

JOHN STEPHENSON, OF NEW YORK, N. Y.

IMPROVEMENT IN CAR-AXLE BOXES.

Specification forming part of Letters Patent No. 49,005, dated July 25, 1865; Reissue No. 8,086, dated February 19, 1878; application filed December 23, 1875.

DIVISION K³.

*To all whom it may concern:*

Be it known that I, JOHN STEPHENSON, of New York, in the county of New York and State of New York, have invented certain new and useful Improvements in Car-Axle Boxes; and I do hereby declare that the following is a full, clear, and exact description thereof, that will enable others skilled in the art to which it appertains to make and use the same, reference being had to the accompanying drawings, and to the letters of reference marked thereon, which form a part of this specification, in which—

Figure 1:
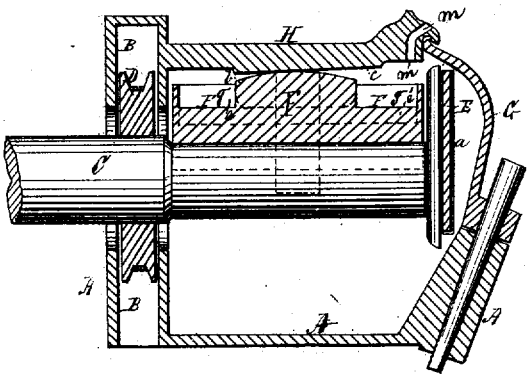
Figure 2:
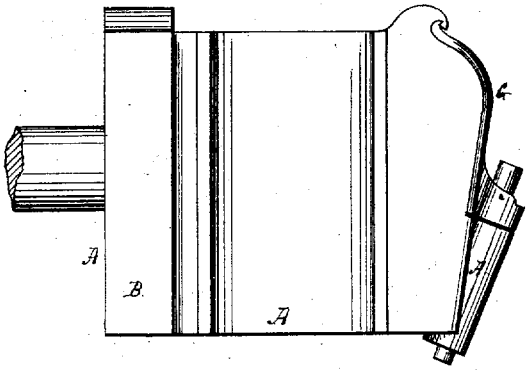
Figure 4:
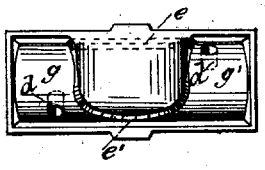
Figure 3:
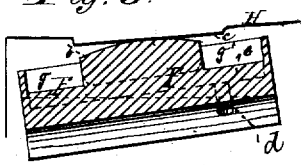

Figure 1 represents a vertical longitudinal section of a car-axle box to which my improvement has been applied, and Fig. 2 a side elevation of the same. Fig. 3 represents a diagram, showing the adjustment of the "brass" or bearing on the journal produced by wear, the dotted line illustrating the line of wear. Fig. 4 represents a plan view of the brass or bearing detached from the box.

The practical operation of railways shows that the axle-journals and brasses or bearings have a tendency to wear most rapidly toward the shoulders of the axle, resulting in a disarrangement of the axle-box with respect to the pedestal and other parts. This, to a certain extent, has heretofore been compensated for by the common practice of reversing the ends of the brasses; but in axle-boxes as ordinarily constructed the process of reversing the brass is a most troublesome one, and consumes much time and labor, and therefore necessitates the use of a more perfect box for the purpose if these troubles are to be obviated. This branch of my invention remedies the evil, and economizes both time and labor.

With these objects in view I confine the bearing or brass within the axle-box by the rear and two side walls of the box, and a check-plate in front, the latter being so arranged that it can (the roof being coterminous, or nearly so, with the axle) be easily lifted out from the axle-box through a door for the purpose in front; then, by simply relieving the journal of weight, the brass can be readily withdrawn and replaced or another substituted therefor.

The axle-box thus constructed is adapted to axle-journals of any of the usual forms; yet the best results are obtained from its use in connection with a plain axle-journal having no shoulders, especially at the outer end.

Again, with the view of diminishing the tendency of the brasses to wear unlevel, I make the contact between the upper side of the brass and the inner side of the roof of the box by longitudinally-diverging segmental bearing-surfaces; or, for the same purpose, the top of the bearing alone may be provided with the longitudinally-diverging segmental surface, and the under side of the roof with a plane surface, or vice versa.

To enable others skilled in the art to make, construct, and use my invention, I will now describe it in detail.

In Fig. 1 of the drawing the axle-box A is represented as being provided with a dust-chamber, B, at its rear end, and the axle-journal C with a self-adjusting collar, D. Each side of the box, at or near its front end, is provided with a shoulder or groove, *a*, for the reception and support of a check-plate, E, whose function is to keep the bearing or brass F and axle-journal in place. The box is also provided with an opening and removable door, G, at its front end, through which to withdraw the check-plate E, and thus leave the brass F or bearing free to be withdrawn as soon as the axle-journal C is relieved from weight.

The brass or bearing F, as shown in Fig. 1, is constructed with a curved surface, *b*, while the under surface *c* of the roof H of the box is shown as being a plane surface; but these conditions, as before stated, may be reversed, or both provided with curved surfaces. Thus constructed, when the brass wears more at one end than the other, the worn end is lowered, and hence, by the action of the segmental bearing-surface, the load is removed farther from the wearing part of the brass, and it is relieved.

Freedom of motion in the brass to adjust itself to the axle-journal is best subserved or obtained by confining the brass between the rear and two side walls by means of the removable check-plate E at its front end.

The diagram, Fig. 3, illustrates the mode in which the brass, as it wears, adjusts itself to the journal.

The usual method of keeping the bearing or brass in its proper position with respect to the shell and other parts of the box, is to make the connection between the bearing and the roof of the box by indentations and corresponding projections, which prevent the bearing from moving endwise. To disengage the bearing from the shell when so made, it is necessary to elevate the shell; but the shell cannot be elevated while in the pedestal unless the lower lip of the journal-orifice in the rear wall of the box is lowered to prevent contact with the axle, in which case the surface of the oil within the box is likewise necessarily lowered, and the difficulty of lubricating the axle-journal thereby greatly increased.

By my method these troubles are avoided, as there is no interlocking of the bearing and roof of shell.

To assist the process of lubrication, I form in the upper side of the bearing one or more cells for holding some of the lubricant, and conduct the latter by suitable channels or passage-ways to the contacting surfaces of bearing and journals. These cells *g g'* communicate with each other by means of a channel or channels, *e e'*, the inner cell *g* being supplied with the lubricant from the front cell *g'*, and the latter through the opening or channel *m*, formed in the front end of the roof H of the axle-box. In the bottom of each cell *g g'* is formed a channel, *d*, through which the lubricant is fed to the contacting surfaces of the bearing and journal. Channel *e* shows one mode of forming the communication between the two cells *g g'*, and channel *e'* another. In the first case it is formed by making a hole or channel through the raised or convexly-curved portion *b* of the brass; in the other, by beveling its ends down to the same plane as the bottom of the cells *g g'*.

For the more perfect operation of this invention it is better to have the axle-box provided with a dust-chamber, B, at its rear end, and the journal C provided with a self-adjusting dust-collar, to exclude the dust and other injurious substances.

Having described my invention, I claim as new and desire to secure by Letters Patent—

1. A car-axle journal brass or bearing in which the central part of its upper surface is transversely raised for contact with the ceiling of the box, and its two ends provided with cells for holding the lubricant, and which are made to communicate with each other by suitable channels or passage-ways, and with the contacting surfaces of the brass and journal, substantially as set forth.

2. The combination of a removable check-plate and a car-axle journal unprovided with a shoulder or button at its outer end with a brass or bearing and an axle-box the contacting surfaces of which do not interlock with each other, substantially as set forth.

3. The combination of a brass or bearing and a car-axle box the contacting surfaces of which on the upper surface of the former and under side of the roof of the latter are formed by one plain and one convexly-curved surface, or by two convexly-curved surfaces, in the line of their length, with a car-axle having a journal unprovided with a collar at its outer end, substantially as and for the purpose set forth.

4. The combination of a brass or bearing with a car-axle box having a shortened roof and a removable door and check-plate, the contacting surfaces of the under side of the roof and upper side of the bearing being formed by one plain and by one convexly-curved surface, or by two convexly-curved surfaces, in the line of their length, substantially as and for the purpose set forth.

5. The combination of a brass or bearing with a car-axle box having a removable door and check-plate, the contacting surfaces of the under side of the roof and upper side of the bearing being formed by one plain and by one convexly-curved surface, or by two convexly-curved surfaces, in the line of their length, substantially as and for the purpose set forth.

6. The combination of a brass or bearing and a car-axle box having a removable door and check-plate, the contacting surfaces of the under side of the roof and upper side of the bearing being formed by one plain and by one convexly-curved surface, or by two convexly-curved surfaces, in the line of their length, with an axle the journal of which is unprovided with a shoulder at its outer end, substantially as and for the purpose set forth.

In testimony that I claim the foregoing I have hereunto set my hand this 7th day of December, 1875.

JOHN STEPHENSON.

Witnesses:

STUART A. STEPHENSON,
WILLIAM J. WALKER.